United States Patent
Whipple et al.

(10) Patent No.: US 8,996,036 B2
(45) Date of Patent: Mar. 31, 2015

(54) AUTONOMOUS LOCATION OF OBJECTS IN A MOBILE REFERENCE FRAME

(75) Inventors: John G. Whipple, San Antonio, TX (US); Theodore R. Wilmes, San Antonio, TX (US); Brian K. Anderson, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 483 days.

(21) Appl. No.: 13/369,954

(22) Filed: Feb. 9, 2012

(65) Prior Publication Data

US 2013/0210405 A1    Aug. 15, 2013

(51) Int. Cl.
- *H04W 24/00* (2009.01)
- *H04W 4/04* (2009.01)
- *H04W 4/02* (2009.01)

(52) U.S. Cl.
CPC .............. *H04W 4/027* (2013.01); *H04W 4/046* (2013.01)
USPC .................................. 455/456.4; 455/456.1

(58) Field of Classification Search
CPC ......... G01C 21/10; H04L 67/12; H04W 4/04; H04W 4/046
USPC ................ 455/456.1–457, 565, 569.2, 412.1, 455/412.2, 59, 61, 70, 456.4
See application file for complete search history.

(56) References Cited

U.S. PATENT DOCUMENTS

| | | |
|---|---|---|
| 7,333,631 B2 | 2/2008 | Roh et al. |
| 7,525,484 B2 | 4/2009 | Dupray et al. |
| 7,764,231 B1 | 7/2010 | Karr et al. |
| 7,856,203 B2 | 12/2010 | Lipovski |
| 7,904,483 B2 | 3/2011 | Koch et al. |
| 7,917,543 B2 | 3/2011 | Koch et al. |
| 7,920,721 B2 | 4/2011 | Unoura |
| 8,351,704 B2 | 1/2013 | Kmiecik et al. |
| 8,442,305 B2 | 5/2013 | Ramalingam |
| 8,725,413 B2 | 5/2014 | Kozak et al. |
| 2005/0063563 A1 | 3/2005 | Soliman |
| 2006/0095172 A1 | 5/2006 | Abramovitch et al. |
| 2008/0045236 A1 | 2/2008 | Nahon et al. |
| 2010/0161225 A1 | 6/2010 | Hyung et al. |
| 2010/0208937 A1 | 8/2010 | Kmiecik et al. |
| 2010/0215216 A1 | 8/2010 | Hong et al. |
| 2010/0215218 A1 | 8/2010 | Takahashi |
| 2010/0304850 A1 | 12/2010 | Gelman et al. |

(Continued)

OTHER PUBLICATIONS

U.S. Office Action, mail date Oct. 9, 2013, issued in related U.S. Appl. No. 13/537,776, (16 pgs).

*Primary Examiner* — Matthew Sams
(74) *Attorney, Agent, or Firm* — Grossman, Tucker et al (57) ABSTRACT

An apparatus and method for estimating a location of an object within a mobile reference frame. Sensor data is received from an accelerometer associated with an object followed by determining from the sensor data that the mobile reference frame is executing one of a set of predetermined maneuvers. In response to such determination: (1) the sensor data is applied to a mathematical model associated with the executed maneuver, the model trained with previously obtained data from one or more reference accelerometers positioned at known locations within the mobile reference frame and estimating the location of the object by applying the sensor data to the mathematical model; and/or (2) incorporating reference accelerometers in the mobile reference frame and comparing the sensor data with the reference accelerometers and estimating the location of the object.

19 Claims, 9 Drawing Sheets

(56) References Cited

U.S. PATENT DOCUMENTS

| | | |
|---|---|---|
| 2011/0077032 A1 | 3/2011 | Correale et al. |
| 2011/0111724 A1 | 5/2011 | Baptiste |
| 2011/0150319 A1 | 6/2011 | Ramalingam |
| 2011/0164832 A1 | 7/2011 | Yoon et al. |
| 2012/0071151 A1* | 3/2012 | Abramson et al. ............ 455/418 |
| 2013/0109345 A1 | 5/2013 | Edge et al. |
| 2014/0005932 A1 | 1/2014 | Kozak et al. |

* cited by examiner

AUTONOMOUS LOCATION OF OBJECTS IN A MOBILE REFERENCE FRAME

FIELD OF INVENTION

The present disclosure relates to autonomous location of objects, and in particular to autonomous location of objects in a mobile reference frame such as a vehicle.

BACKGROUND

Existing location systems typically employ radio, ultrasound or optical signals to determine a position of a target object using angle of arrival (AOA), time difference of arrival (TDOA) or frequency difference of arrival (FDOA) techniques. These systems generally require supporting infrastructure such as transmitters and receivers which are external to the target and able to sense the target and/or be visible to the target. An enclosed target, for example an object in a vehicle, may not be located using these techniques.

Inertial navigation systems provide an alternative method for self location of an object in an enclosed environment. These systems use accelerometers but they require calibration and tend to drift over time thus requiring periodic re-calibration which limits their accuracy and suitability for many applications.

What is needed, therefore, are improved methods and apparatus for autonomous location of an object in an enclosed environment, and in particular, those that will not require external supporting infrastructure.

SUMMARY

The present disclosure describes methods and apparatus for performing autonomous location of objects, and in particular autonomous location of objects in a mobile reference frame such as a vehicle. The vehicle may be, for example, an automobile, a train, a boat or an airplane. The object may be any object for which it is advantageous to determine a location within the mobile reference frame. The object may be a person or extend to cargo such as shipping containers. In some embodiments the object may a mobile phone. In these embodiments, a determination that the object is located in a driver (or vehicle operator) position may result in the disabling of texting or other phone operations.

Sensor data may therefore be received from an accelerometer associated with an object followed by determining from the sensor data that the mobile reference frame is executing one of a set of pre-determined maneuvers. In response to such determination: (1) the sensor data is applied to a mathematical model associated with the executed maneuver, the model trained with previously obtained data from one or more reference accelerometers positioned at known locations within the mobile reference frame and estimating the location of the object by applying the sensor data to the mathematical model; and/or (2) incorporating reference accelerometers in the mobile reference frame and comparing the sensor data with the reference accelerometers and estimating the location of the object.

The techniques described herein may not require communication with other systems, either within or external to the vehicle, such as, for example, a global positioning system (GPS) sensor.

BRIEF DESCRIPTION OF DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION OF PREFERRED EMBODIMENTS

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

The present disclosure relates to autonomous location of objects, and in particular to autonomous location of objects in a mobile reference frame such as any moving vehicle. The vehicle may therefore include, but not be limited to, an automobile, truck, train, boat or an airplane. The object may be any object for which it is advantageous to determine the location of the object within a mobile reference frame. In some embodiments the object may be a mobile phone. In these embodiments, a determination that the object is located in a driver (or vehicle operator) position may result in some functionality adjustment within the object, such as in the case of a mobile phone, the disabling of the ability to transmit texts and/or email or other phone operations. The object may also be programmed such that upon an increase in altitude over a selected threshold, all transmit and receive functionality is disabled, in accordance with particular airline regulations.

The estimation of the location of the object may be preferably accomplished by analysis of 3-axis accelerometer sensor data associated with the object to determine the type of maneuver that the mobile reference frame (or vehicle) is executing and in response to determining the type of maneuver: (a) applying the sensor data to a mathematical model associated with the executed maneuver, where the model is trained with previously obtained data from one or more reference accelerometers positioned at known locations within the mobile reference frame and estimating the location of the object by applying the sensor data to the model; and/or (b) incorporating reference accelerometers in the mobile reference frame and comparing the sensor data with the reference accelerometers and estimating the location of said object. The techniques described herein preferably do not require communication with other systems, either within or external to the vehicle, such as, for example, a global positioning system (GPS) sensor. Accordingly, coupling with a GPS sensor is an optional feature.

It should be noted that the disclosure herein is also generally applicable to that situation where objects or persons may report their location to a location tracking system. For example, a package in a truck or a pod on a container ship that requires to be located, or a passenger on a cruise ship who may wish to be located for a variety of reasons. The apparatus herein may be made relatively small and is relatively inexpensive and has relatively low power requirements. The apparatus may also be attached to a package or provided to passengers on a cruise ship as a pin or software application downloaded to a smart phone which would allow an asset/passenger tracking system to locate and visually display the location of cargo or the passenger.

Figure 1:
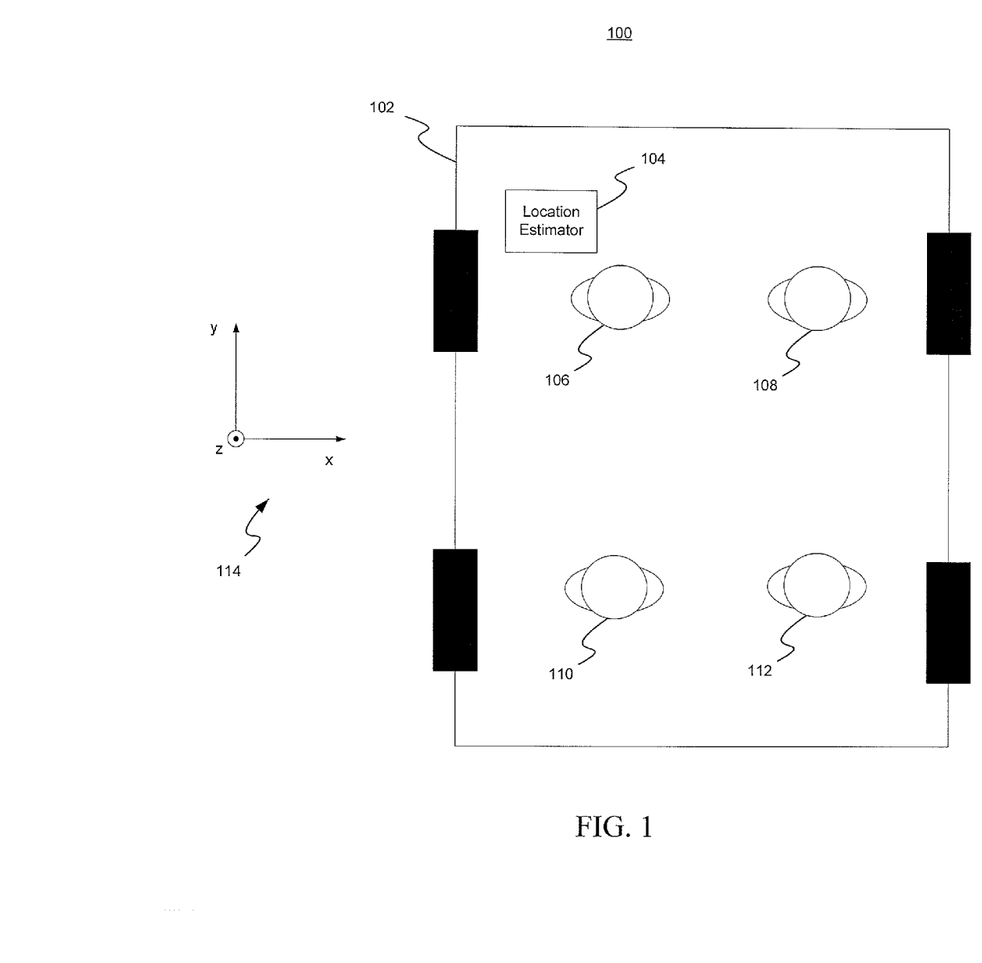
FIG. 1 illustrates a system diagram of one exemplary embodiment consistent with the present disclosure.

Referring now to FIG. 1, there is shown a diagram 100 of a system deployment of one exemplary embodiment consistent with the present disclosure. Location estimator 104 is shown within a vehicle 102 which may, for example be an automobile that corresponds to a mobile reference frame. The reference frame may be described by a 3 axis coordinate system 114 where the y-axis represents the forward/backward direction, the x-axis represents the left/right direction and the z-axis represents the upward direction out of the plane of the vehicle 102. Also shown are driver position 106, front passenger position 108, rear left side passenger position 110 and rear side right passenger position 112. These positions illustrate one possible set of exemplary locations of interest within the vehicle 102 but other configurations are possible. The location estimator 104 may be associated with an object such as, for example, a mobile phone, the location of which, within the vehicle 102, may be of interest. In some embodiments, the location estimator 104 may be integrated with the object.

Figure 2A:
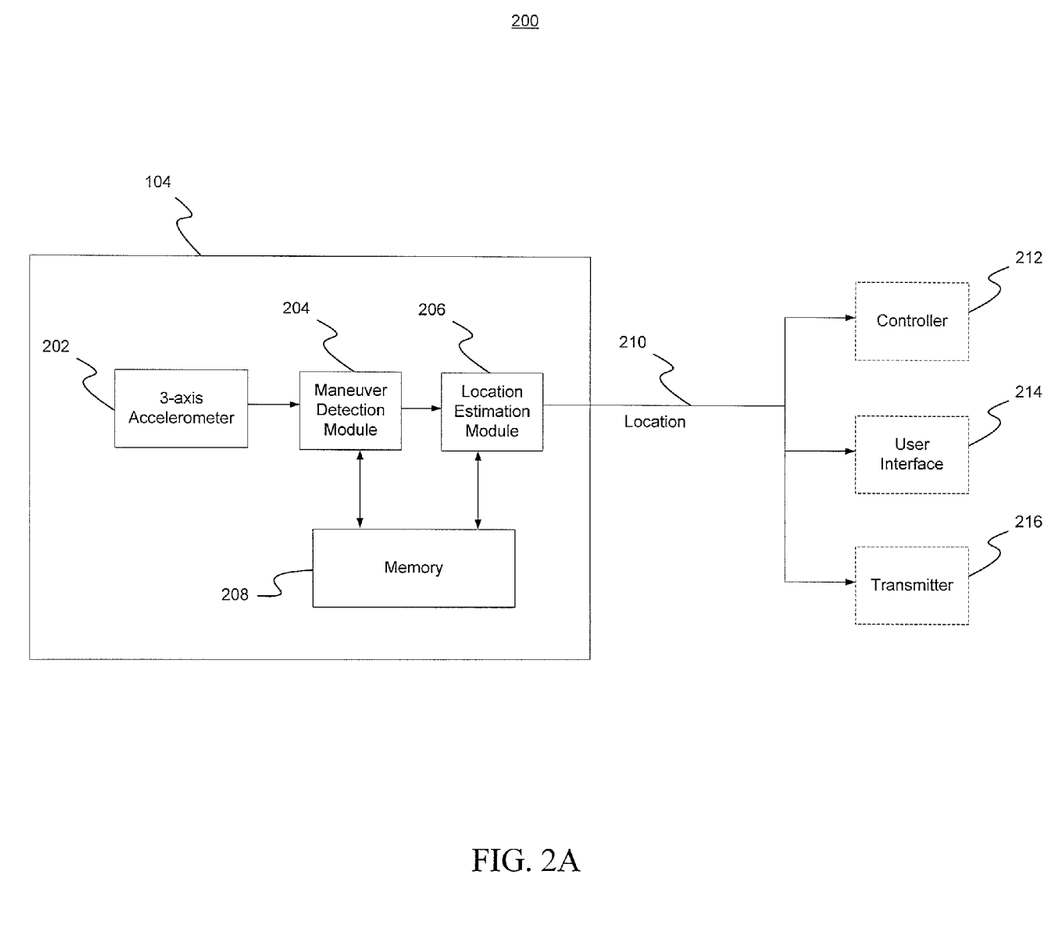
FIG. 2A illustrates a system block diagram of one exemplary embodiment consistent with the present disclosure.

Referring now to FIG. 2A, there is shown a system block diagram 200 of one exemplary embodiment consistent with the present disclosure. In this embodiment, location estimator 104 that may be positioned within a particular object is shown to preferably include a 3-axis accelerometer 202, a maneuver detection module 204, a location estimation module 206 and a memory 208. In some embodiments, the maneuver detection module 204 and/or the location estimation module 206 may be implemented in software and executed by a processor or may be implemented in hardware such as, for example, an application specific integrated circuit (ASIC) or field programmable gate array (FPGA). The 3-axis accelerometer 202 provides x, y and z-axis acceleration data which may be sampled as the vehicle moves. The maneuver detection module 204 and the location estimation module 206 work with this sampled sensor data as well as previously obtained accelerometer data stored in memory 208 to perform the maneuver detection and location estimation as will be described in greater detail below.

It should be noted that the memory 208 may incorporate a mathematical model formulated from data collected from a number of vehicles in a particular vehicular class, such as cars or trucks, and that the model formulated may then be generalized and used for different cars or trucks including those cars or trucks that were not relied upon to create the model. Among other features, the use of a model may be relatively small byte-wise and provide relatively faster processing but again supply the same effect of comparing the 3-axis accelerometer data to stored accelerometer data stored in memory 208 to estimate a location determination for a given object. See again, FIG. 2A.

Preferably, the model noted above is a mathematical model that may be developed by first pre-processing the previously obtained data into a format that is suitable for consumption by a machine learning algorithm. The preprocessing may preferably include mathematical operations and transformations such as Fast Fourier Transform or wavelet transform, attribute selection, normalization and other pre-processing techniques. After the data is pre-processed it may then be used to train a model via a machine learning algorithm. A machine learning algorithm may include but not be limited to neural networks, support vector machines, and/or decision trees. Once a model is created with sufficient accuracy (i.e. the model reliably allows for the location determination herein with an accuracy of greater than 50%), previously unseen sensor data may be applied to the model (i.e. processed within the model) to make a determination of the location of the sensor within the vehicle.

Figure 2B:
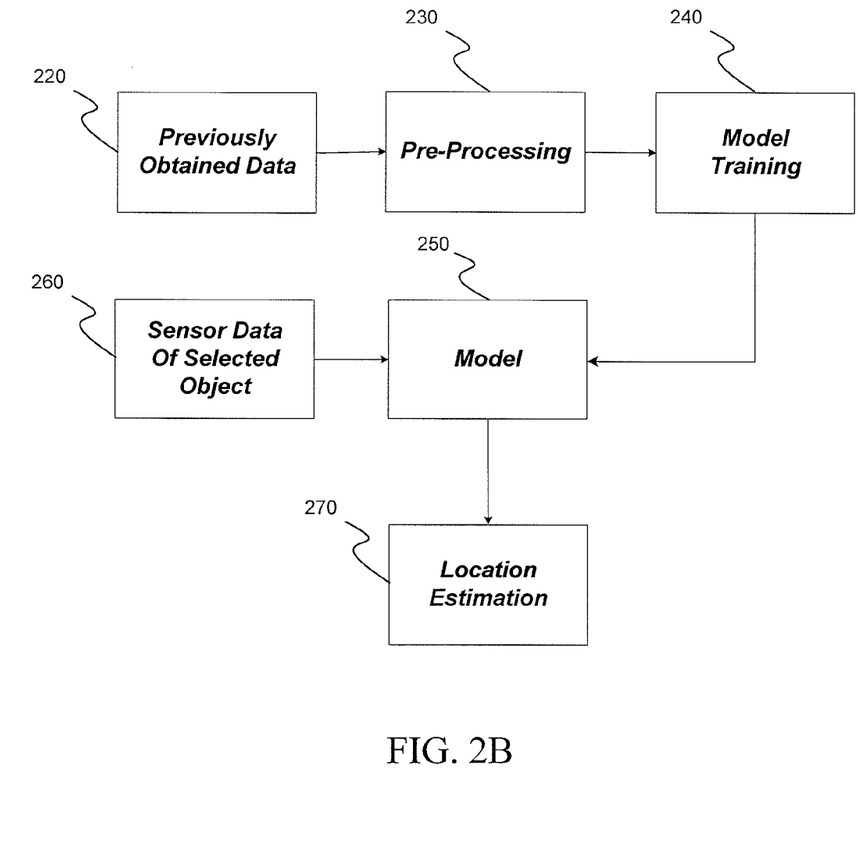
FIG. 2B illustrates the use of a mathematical model in accordance with the present disclosure.

Reference is made to FIG. 2B which illustrates the above sequence of securing previously obtained data 220, pre-processing of the data 230, training of the mathematical model 240, and creation of the model 250. As noted, the live sensor data from a 3-axis accelerometer associated with a selected object 260 may then be applied to the model and the system may then output location estimation 270.

In some embodiments, the location estimate 210 generated by location estimator 104 may optionally be provided to a controller 212, a user interface 214 and/or a transmitter 216. The controller 212 may be preferably associated with a mobile phone and may be configured to enable (i.e. permit) or disable a functional feature therein, such as texting or other phone functionality depending on the location estimate. That is, the controller may evaluate the location estimate based upon stored location coordinates and output a command that may enable or disable one or more particular functional features of the object containing the location estimator 104.

Reference to functional feature may therefore be understood as any performance functionality of the object, which in the case of a mobile phone, may include texting as noted, as well as answering and/or initiating a call, as well as internet browsing capability. In such regard, the functionality of manual inputting numerical dialing information by number may be disabled and only voice activation may be allowed. Furthermore, only voice input of texting or email data may be permitted with manual input of letters and words completely restricted. In addition, internet access (e.g. browsing) may be selectively or completely restricted. Furthermore, the transmitter 216 may transmit the location estimate to a remote entity interested in determining the location of the object. This may be useful, for example, where the vehicle 102 is a boat and the object is an item of cargo or a passenger to be located.

Figure 2C:
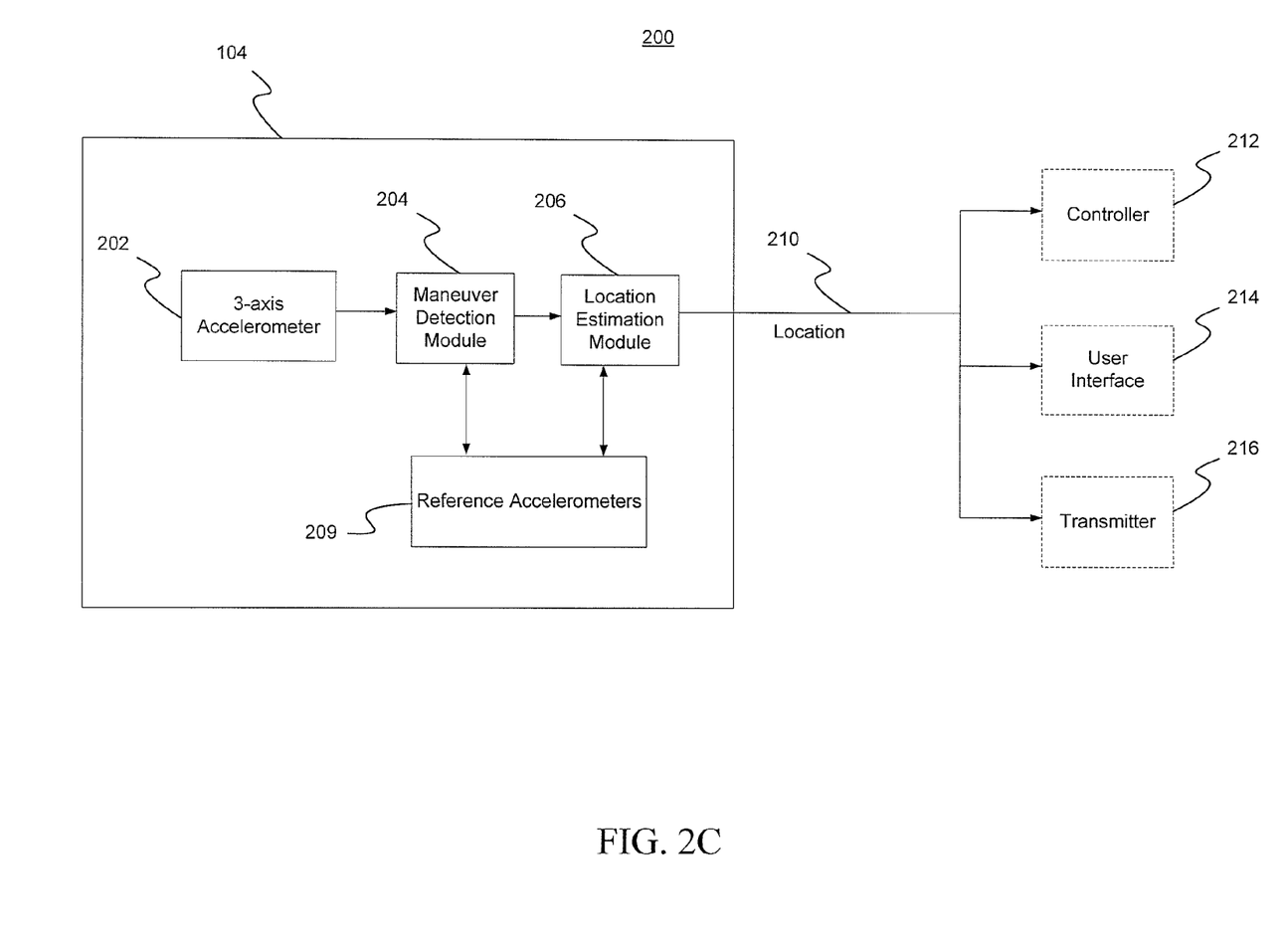
FIG. 2C illustrates a system block diagram of another exemplary embodiment consistent with the present disclosure.

Referring now to FIG. 2C, there is shown again the system block diagram 200. However, in this embodiment, instead of utilizing the above referenced mathematical model, the system may utilize real-time acceleration data from reference accelerometers 209 within the mobile frame of reference which may communicate with a processor that may compare and interpolate between said acceleration data inputs to again determine object location. The reference accelerometers in FIG. 2C may therefore be used alone or in conjunction with memory 208 shown in FIG. 2A.

Figure 3:
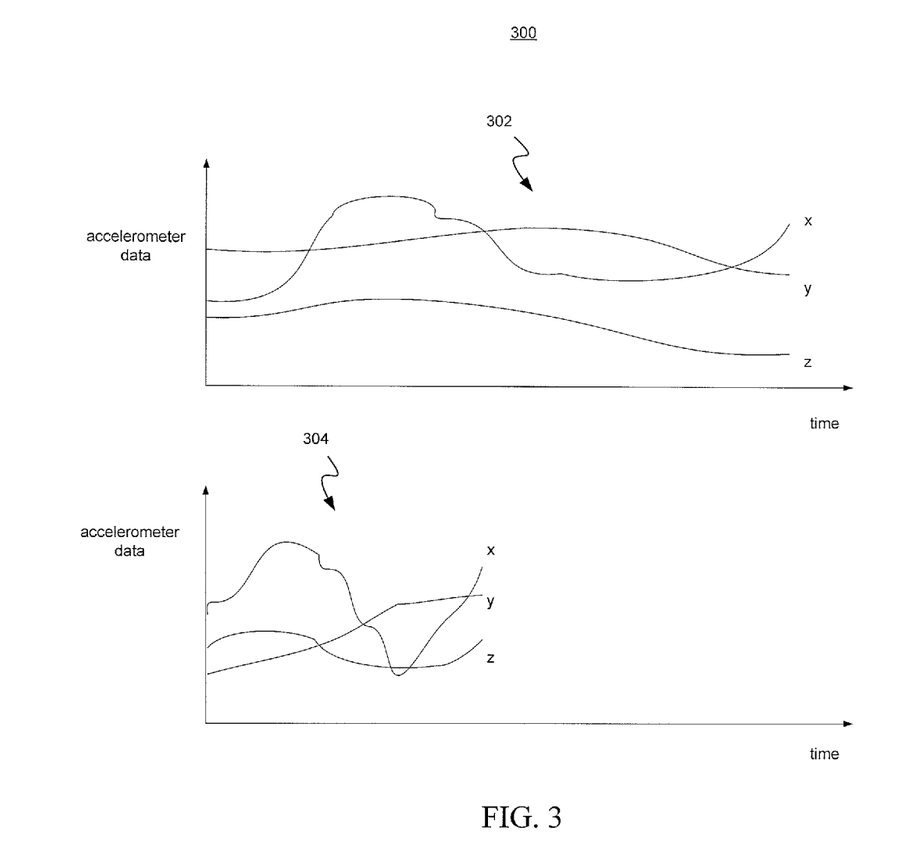
FIG. 3 illustrates plots of accelerometer data consistent with an exemplary embodiment of the present disclosure.

Referring now to FIG. 3, there is shown a representative plot of accelerometer data 300 consistent with an exemplary embodiment of the present disclosure. Accelerometer data 302 may represent a time series plot of the x, y and z-axis accelerometer sensor outputs, from accelerometer 202, over time as the vehicle 102 is in motion and executing various maneuvers including acceleration, braking, and left and right turns. In other words, accelerometer data 302 may be real-time data collected as the vehicle 102 is in motion during a time period when the object location is being estimated.

Accelerometer data 304 may represent a time series plot of x, y and z-axis accelerometer sensor outputs stored in memory 208, having been previously obtained from one or more reference accelerometers positioned at known locations within the vehicle 102 (or a similar vehicle) and corresponding to a known maneuver executed by the vehicle. In other words, accelerometer data 304 may be reference data previously obtained from test driving a vehicle that has been instrumented with a number of reference accelerometers positioned at known locations within the vehicle. The test drive may therefore include the execution of maneuvers of interest, perhaps repeatedly, to create a library of accelerometer data corresponding to each maneuver at each known location within the vehicle.

Maneuvers, such as starts, stops and turns, generate acceleration curves in the x, y and z-axis having characteristics that are measurable, repeatable and identifiable. For example, a right turn maneuver of an automobile may produce a momentary increase in acceleration to the right accompanied by a momentary deceleration and a momentary increase in the z-axis acceleration that is more pronounced on the passenger side of the vehicle. As another example, a braking maneuver may exhibit a gradual forward deceleration followed by more abrupt motions as the vehicle comes to a stop and settles with some oscillations. At the moment the vehicle comes to a stop, the front portion may move downward as the rear portion moves upward. Other maneuvers, as well as events like driving over a bump, have similar characteristics that can be identified along the 3 acceleration axes. These acceleration characteristics, associated with a maneuver and a location within the vehicle, may be determined and stored in memory.

Data pertaining to maneuver characteristics may be obtained for different types or classes of vehicles which may exhibit different performance and handling characteristics due to factors such as weight, center of gravity and type of suspension. Maneuver detection and location estimation accuracy may be improved by matching the collected characteristic data from a vehicle that most closely resembles the type of the target vehicle, for example small car, large car, truck or sport utility vehicle.

During operation of the location estimator 104, the maneuver detection module 204 samples the 3-axis accelerometer 202 and analyzes the real-time sensor data searching for a maneuver of interest that exhibits the stored characteristics. In some embodiments, the analysis may be a correlation operation that detects a match between the real-time sensor data and the stored characteristics.

When a maneuver of interest has been detected, the location estimation module 206 compares the real-time sensor data from accelerometer 202 to the stored data for that maneuver from various locations of interest within the vehicle. A location estimate may be determined based on the closest match or, in the case of multiple matches, on a weighted interpolation between the multiple matches. In some embodiments, the location estimation may be performed in two steps: the first being a determination of front versus rear of vehicle, the second being a determination of left side versus right side of vehicle.

Figure 4:
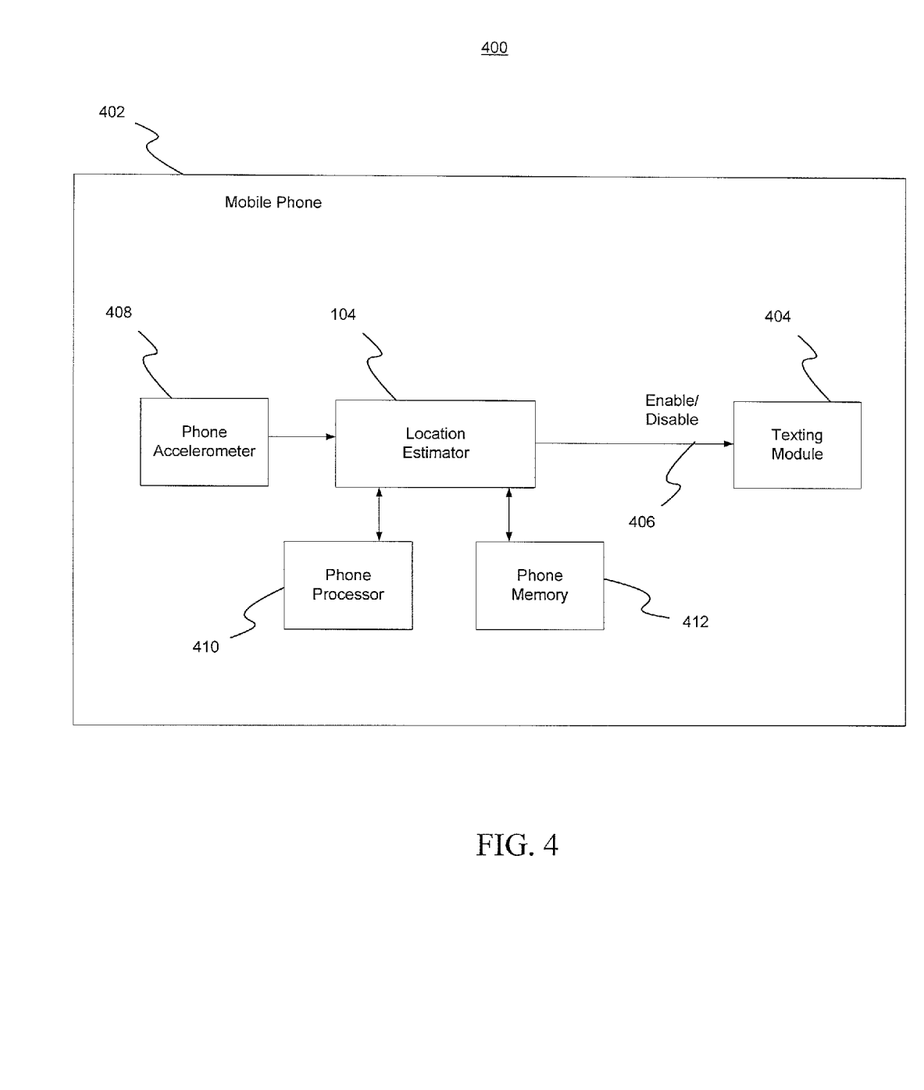
FIG. 4 illustrates a system block diagram of another exemplary embodiment consistent with the present disclosure.

Referring now to FIG. 4, there is shown a system block diagram 400 of another exemplary embodiment consistent with the present disclosure. In this embodiment, location estimator 104 is preferably integrated in an object such as a mobile phone or other wireless communication device 402. Location estimator 104 obtains sensor samples from the phone supplied accelerometer 408. Location estimator 104 may execute on phone processor 410 based on software stored in phone memory 412. Phone memory 412 may also store previously obtained characteristics and acceleration data associated with maneuvers of interest. Location estimator 104 may provide an enable/disable signal 406 to texting module 404 of phone 402 to prevent texting (inputs of letters for sending of text or email messages to a $3^{rd}$ party) or other phone operations by the driver of a vehicle. As noted above, in the broad context of the present disclosure, any particular functionality of the object, such as a mobile phone, may therefore be selectively enabled or disabled.

Figure 5:
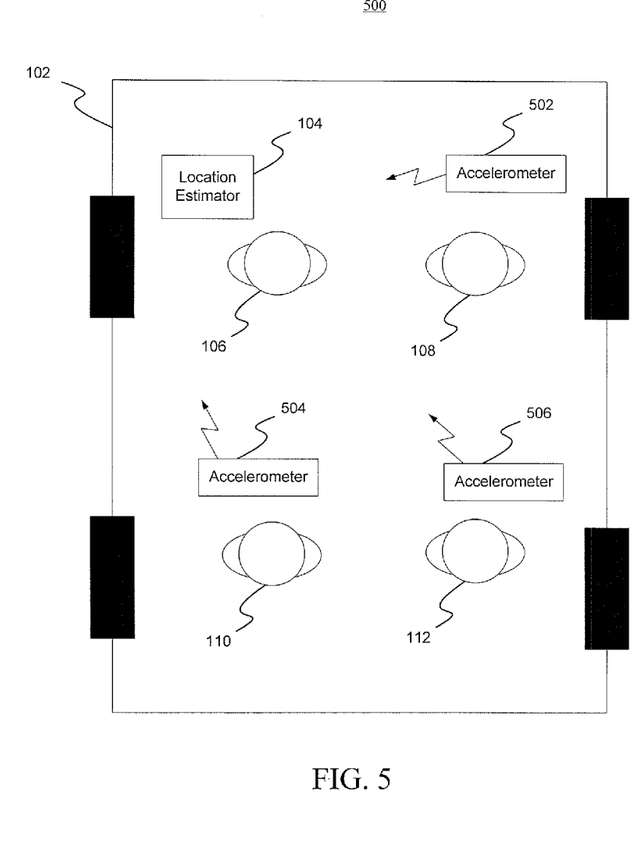
FIG. 5 illustrates a system diagram of another exemplary embodiment consistent with the present disclosure.

Referring now to FIG. 5, there is shown a diagram 500 of a system deployment of another exemplary embodiment consistent with the present disclosure. Location estimator 104 is shown within a vehicle 102 as in FIG. 1. Also shown are driver position 106, front passenger position 108, rear left side passenger position 110 and rear side right passenger position 112. The location estimator 104 may be associated with or integrated in an object such as, for example, a mobile phone, the location of which, within the vehicle 102, may be of interest. Additional accelerometers 502, 504 and 506 are shown at pre-defined locations within the vehicle 102 and may be configured to communicate with and collaborate with location estimator 104. By providing additional accelerometer data from known locations within the vehicle, the location estimate produced by location estimator 104 may be established or improved in exchange for some additional cost and complexity of the system. In some embodiments, the communication may be wireless. In some embodiments, the additional accelerometers may be implemented as additional instances of the location estimator 104.

Figure 6:
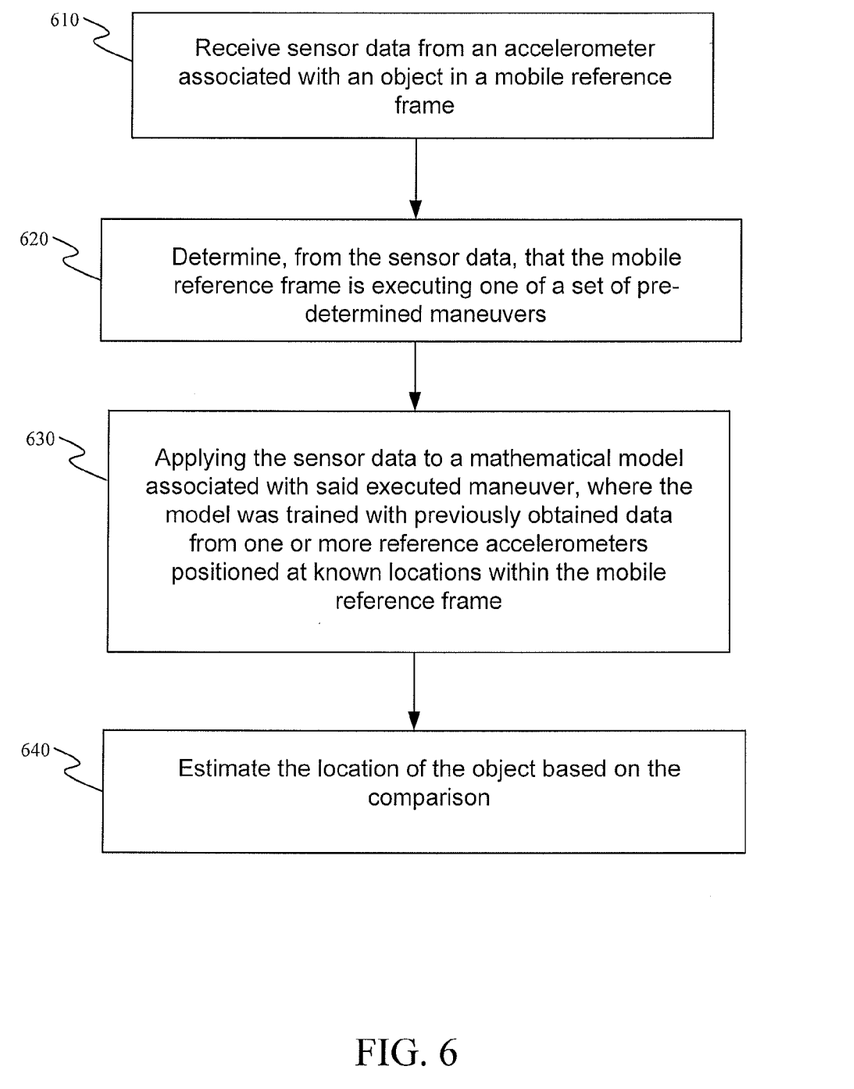
FIG. 6 illustrates a flowchart of operations of one exemplary embodiment consistent with the present disclosure.

Referring now to FIG. 6, there is supplied a flowchart 600 of one of the preferred methods consistent with an exemplary embodiment of an autonomous location estimator according to the present disclosure. At operation 610, sensor data is received from an accelerometer associated with an object in a mobile reference frame. The mobile reference frame may be a vehicle and the object may be any object for which a location estimate is desired, such as, for example, a mobile phone. At operation 620, a determination is made, from the sensor data, that the mobile reference frame is executing one of a set of pre-determined maneuvers. Predetermined maneuvers may include starting, stopping and turning left or right. At operation 630, in response to the determination, the sensor data is applied to the mathematical model associated with the executed maneuver, where the model was trained with previously obtained data from one or more reference accelerometers positioned at known locations within the mobile reference frame followed by operation 640, where an estimate is made of the location of the object based on the input of the sensor data to the model.

In view of the foregoing, it may be appreciated that the present disclosure also relates to an article comprising a non-transitory storage medium having stored thereon instructions that when executed by a machine result in the operation of receiving sensor data from an accelerometer associated with the object and determining from the sensor data that the mobile reference frame is executing one of a set of predetermined maneuvers. Accordingly, in response to said determining from the sensor data that the mobile reference frame is executing one of a set of predetermined maneuvers, the article may (a) apply the sensor data to a mathematical model associated with the executed maneuver, the model trained with previously obtained data from one or more reference accelerometers positioned at known locations within the mobile reference frame and estimating the location of the object by applying the sensor data to the mathematical model; and/or (b) compare the acceleration data to data received from reference accelerometers in the mobile reference frame and estimate the location of the object.

Figure 7:
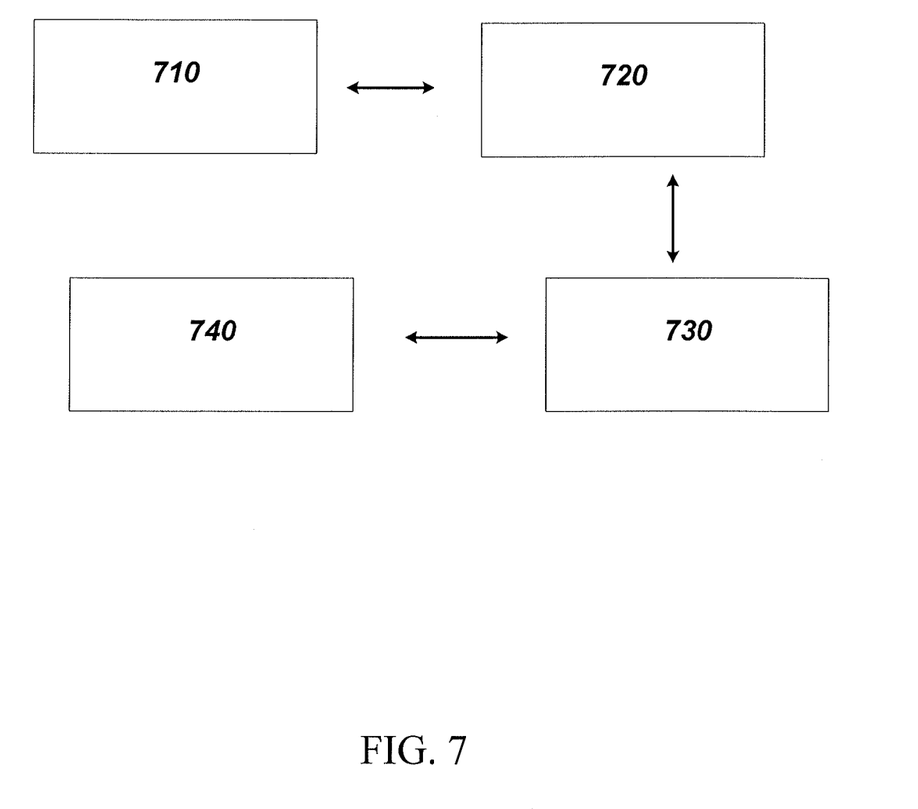
FIG. 7 illustrates a processor, machine readable media, accelerometer input and user interface that may be employed to provide autonomous location of an object in a mobile reference frame.

It should also be appreciated that the functionality described herein for the embodiments of the present invention may therefore be implemented by using hardware, software, or a combination of hardware and software, as desired. If implemented by software, a processor and a machine readable medium are required. The processor may be any type of processor capable of providing the speed and functionality required by the embodiments of the invention. Machine-readable memory includes any non-transitory media capable of storing instructions adapted to be executed by a processor. Non-transitory media include all computer-readable media with the exception of a transitory, propagating signal. Some examples of such memory include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on a medium in either a compressed and/or encrypted format. Accordingly, in the broad context of the present invention, and with attention to FIG. 7, the system and method for the herein disclosed autonomous location of an object in a mobile reference frame may be accomplished with a processor (710) and machine readable media (720) and user interface (730) plus accelerometer input (740).

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for estimating a location of an object within a mobile reference frame comprising:
    receiving sensor data from an accelerometer associated with said object;
    determining from said sensor data that said mobile reference frame is executing one of a set of pre-determined maneuvers;
    in response to said determining one of a set of predetermined maneuvers,
    applying said sensor data to a mathematical model associated with said executed maneuver, said model being trained with previously obtained data from one or more reference accelerometers positioned at known locations within said mobile reference frame;
    estimating said location of said object by applying said sensor data to said mathematical model;
    receiving sensor data from at least one reference accelerometer positioned at a known location within said mobile vehicle reference frame;
    comparing the sensor data received from the accelerometer associated with the object to the sensor data received from the at least one reference accelerometer; and
    refining the location estimate for the object based on the comparison.

2. The method of claim 1, wherein said set of pre-determined maneuvers includes at least one of a right turn, a left turn, accelerating or decelerating.

3. The method of claim 1, wherein said mobile reference frame is a vehicle.

4. The method of claim 1, wherein said object has the ability to provide selected functionality to a user and said estimated location of said object is evaluated and said selected functionality is enabled or disabled.

5. The method of claim 1, wherein said object is a mobile phone having texting or email functionality.

6. The method of claim 5, further comprising disabling texting or email capability of said mobile phone in response to estimating said location to be a driver's position within a vehicle associated with said mobile reference frame.

7. The method of claim 1 wherein said object reports its position to a location tracking system.

8. An apparatus for estimating a location of an object within a mobile reference frame comprising:
    an accelerometer configured to provide acceleration data associated with said object;
    a maneuver detection module configured to determine from said acceleration data that said mobile reference frame is executing one of said pre-determined maneuvers; and
    a location estimation module configured to:
    apply said acceleration data to a mathematical model associated with said executed maneuver, said model being trained with previously obtained data from one or more reference accelerometers positioned at known locations within said mobile reference frame;
    estimate said location of said object by applying said sensor data to said mathematical model, wherein the location estimation module is further configured to:
    receive sensor data from at least one reference accelerometer positioned at a known location within said mobile vehicle reference frame;
    compare the sensor data received from the accelerometer associated with the object to the sensor data received from the at least one reference accelerometer; and
    refine the location estimate for the object based on the comparison.

9. The apparatus of claim 8, wherein said mobile reference frame is a vehicle.

10. The apparatus of claim 8 wherein said object has the ability to provide selected functionality to a user and said estimated location of said object is evaluated and said selected functionality is enabled or disabled.

11. The apparatus of claim 8, wherein said object is a mobile phone having texting or email functionality and said accelerometer is integrated with said mobile phone.

12. The apparatus of claim 11, further comprising a controller module configured to disable texting or email functionality of said mobile phone in response to estimating said location to be a driver's position within a vehicle associated with said mobile reference frame.

13. The apparatus of claim 8, further comprising one or more additional accelerometers positioned at locations within said mobile reference frame, said additional accelerometers configured to provide additional current acceleration data associated with said object for use in said maneuver detection and said location estimation.

14. An article comprising a non-transitory storage medium having stored thereon instructions that when executed by a machine result in the following operations:
- receiving sensor data from an accelerometer associated with said object;
- determining from said sensor data that said mobile reference frame is executing one of a set of pre-determined maneuvers;
- in response to said determining that said mobile reference frame is executing one set of predetermined maneuvers, carrying out the following:
- applying said sensor data to a mathematical model associated with said executed maneuver, said model being trained with previously obtained data from one or more reference accelerometers positioned at known locations within said mobile reference frame;
- estimating said location of said object by applying said sensor data to said mathematical model;
- receiving sensor data from at least one reference accelerometer positioned at a known location within said mobile vehicle reference frame;
- comparing the sensor data received from the accelerometer associated with the object to the sensor data received from the at least one reference accelerometer; and
- refining the location estimate for the object based on the comparison.

15. The article of claim 14 wherein said set of pre-determined maneuvers includes at least one of a right turn, a left turn, accelerating or deceleration.

16. The article of claim 14 wherein said mobile reference frame is a vehicle.

17. The article of claim 14 wherein said object has the ability to provide a selected functionality to a user and said estimated location of said object is evaluated and said selected functionality is enabled or disabled.

18. The article of claim 14 wherein said object is a mobile phone having texting or email functionality.

19. The article of claim 18 wherein said operations further comprise disabling texting or email functionality of said mobile phone in response to estimating said location to be a driver's position within a vehicle associated with said mobile reference frame.

* * * * *